UNITED STATES PATENT OFFICE.

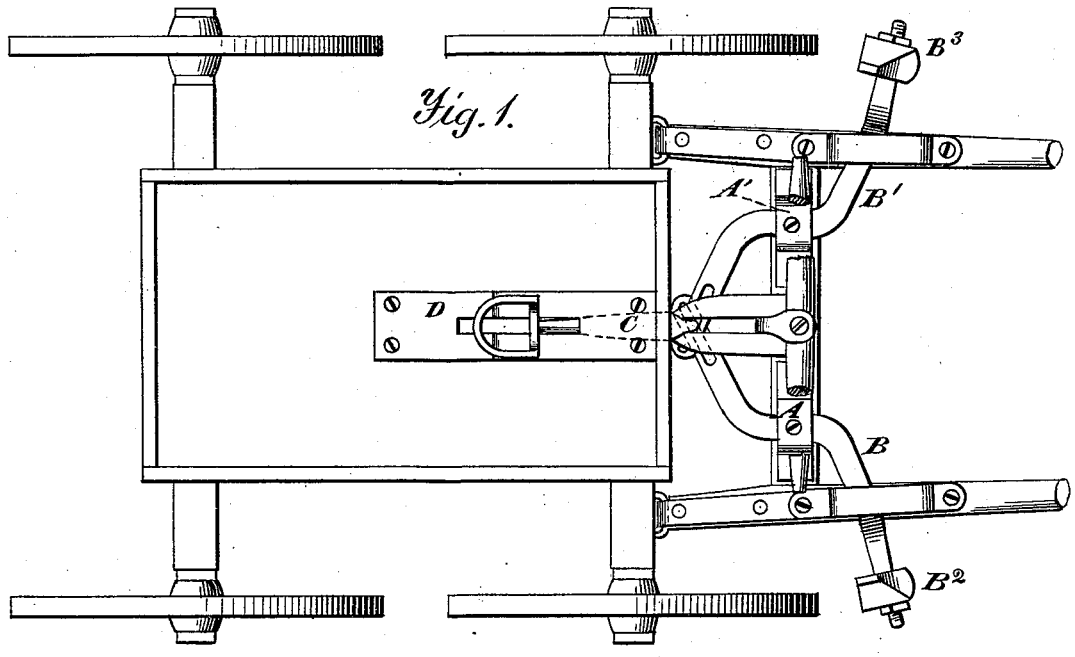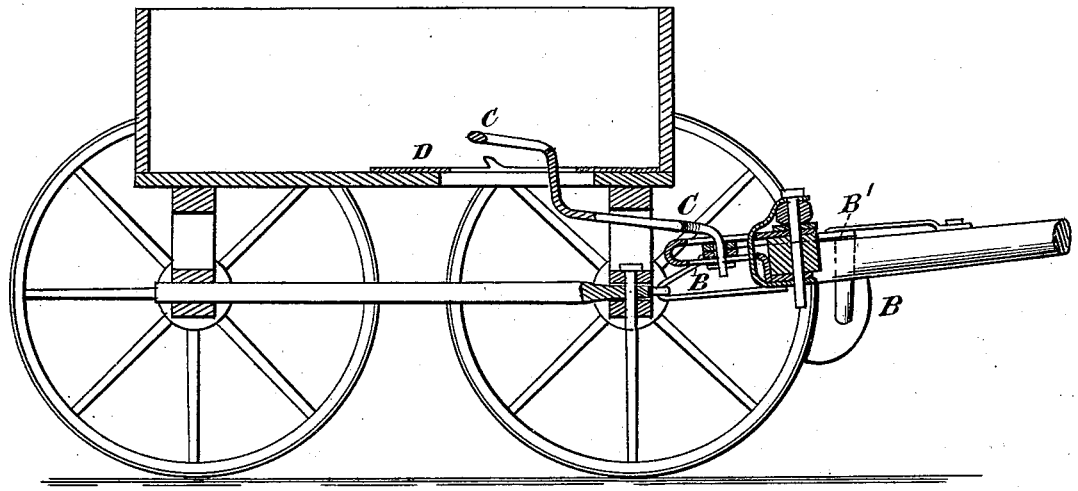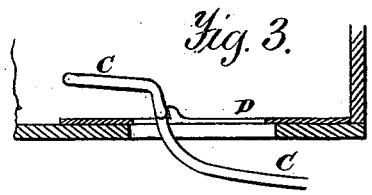

JOHN RIDDLESBERGER, OF WAYNESBOROUGH, PENNSYLVANIA.

WAGON-BRAKE.

SPECIFICATION forming part of Letters Patent No. 228,934, dated June 15, 1880.

Application filed May 4, 1880. (No model.)

*To all whom it may concern:*

Be it known that I, JOHN RIDDLESBERGER, a citizen of the United States, residing at Waynesborough, in the county of Franklin and State of Pennsylvania, have invented certain new and useful Improvements in Wagons; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to brakes for wagons and other road-vehicles in which the retarding force is applied to the forward wheels thereof; and the objects of my improvements are, first, to provide a brake mechanism which may be applied to the shafts or cross-bar between the shafts of a carriage or wagon and be operated by the occupant without leaving his seat; second, to cause the same mechanism which applies to brakes to hold the shafts in an elevated position when the vehicle is not in use.

I attain these objects by the mechanism illustrated in the accompanying drawings, in which—

Figure 1 is a plan view of a wagon having my improved device applied thereto, the levers which apply the brakes being shown, as well as the brake-shoes and the slide which operates them. Fig. 2 is a sectional elevation, showing the arrangement of the parts above alluded to and the locking device for holding the shafts or tongue in an elevated position; and Fig. 3 is a detail view, showing the slide which operates the brakes as locked in the proper position for keeping the shafts or tongue elevated.

Similar letters refer to similar parts throughout the several views.

I am aware that it is not novel to apply the retarding force or resistance to the front wheels of a road-vehicle, such an arrangement being shown and described in a patent granted to John Snyder on the 5th of July, 1864. I do not therefore claim, broadly, such an arrangement of parts as will permit of such an application, but limit my invention to the combinations and arrangements hereinafter described.

My improvements are applicable to all sorts of vehicles for use upon common roads, whether they are provided with two or with four wheels, the drawings illustrating it as applied to one having four wheels.

In constructing my brake and in applying it there are placed upon each of the shafts of a one-horse vehicle, or upon the hounds which support the tongue when constructed for two or more horses, brackets A A', to which levers B B' are pivoted. These levers are bent substantially as shown in Fig. 1, and have in their ends slots for permitting them to be operated by a slide placed in the bottom of the carriage, as hereinafter described.

To the outer ends of the levers B B' there are attached brake blocks or shoes B² and B³, the latter being so arranged upon the former that when the inner slotted ends of the levers are pushed forward the blocks or shoes will be applied to the front portions of the forward wheels.

In providing the means for operating the levers for applying the brakes and for releasing them, a sliding bar is passed rearward from the inner ends of the levers B B', to which it is attached by a hooked projection or by other suitable means, and at any suitable point is bent upward and made to pass through the floor of the carriage, at which point it is again bent, as shown in Figs. 2 and 3, so as to extend rearwardly, a loop or other suitable device being formed upon its rear end for operating it.

From the above description it will be seen that the occupant of the vehicle can at any time place his foot upon the sliding bar C and press it forward, which will, as above described, apply the brakes, and then, by moving the same bar rearward, he can release them from contact with the wheels.

For the purpose of providing means for holding the shafts or tongue of vehicles in an elevated position when not in use, and thus preventing them from being broken by animals stepping on them or by being run over by other vehicles or otherwise injured, there is placed upon the floor of the carriage a plate, D, of metal, which has a slot formed in it, through which the vertical portion of the sliding bar C passes, said plate being provided upon its upper surface with projections, as shown in Fig. 2; and when it is desirable to lock the shafts or tongue in an elevated position the sliding bar is forced rearwardly far enough to allow the shoulders formed on each of its sides to engage with the projection on the plate, and the desired result will be accomplished.

Having thus described my improvements, what I claim, and desire to secure by Letters Patent, is—

1. In combination with the shafts or tongue of a road-vehicle, the levers B and B', brake blocks or shoes $B^2 B^3$, and the operating sliding bar C, the parts being arranged for joint operation, substantially as set forth.

2. In combination with the body and shafts or tongue of a road carriage or wagon, the levers B B', sliding bar C, and a locking-plate, D, the parts being arranged for joint operation, substantially as described, and for the purpose specified.

In testimony whereof I affix my signature in presence of two witnesses.

JOHN RIDDLESBERGER.

Witnesses:
 JOHN F. RIDER,
 E. ELDEN.